| United States Patent [19] | [11] Patent Number: 4,607,059 |
| Kmiec et al. | [45] Date of Patent: Aug. 19, 1986 |

[54] GAS-RELEASING COMPOSITION FOR TAILORING GAS EVOLUTION OF SYSTEM IR 2811

[75] Inventors: Chester J. Kmiec, Amherst; Michael F. Novits, Buffalo, both of N.Y.

[73] Assignee: Pennwalt Corporation, Philadelphia, Pa.

[21] Appl. No.: 780,124

[22] Filed: Sep. 25, 1985

[51] Int. Cl.$^4$ ................................................. C08J 9/10
[52] U.S. Cl. ........................................ 521/88; 521/89; 521/95; 521/134; 521/139; 521/143; 521/147; 521/148; 521/180; 521/189
[58] Field of Search ..................... 521/88, 89, 95, 134, 521/139, 143, 147, 148, 189, 180

[56] References Cited

U.S. PATENT DOCUMENTS

| 4,322,502 | 3/1982 | Stott et al. | 521/138 |
| 4,327,196 | 4/1982 | West | 521/138 |
| 4,393,148 | 7/1983 | Kamens | 521/138 |
| 4,435,525 | 3/1984 | Kamens | 521/138 |

*Primary Examiner*—Morton Foelak

[57] ABSTRACT

A gas-releasing composition of a t-alkylhydrazinium salt and/or a carbonylhydrazine and at least one compound selected from free radical forming sources, metal oxides, and sulfur and/or sulfur donor compounds wherein when sulfur and/or a sulfur donor compound is used, the composition will also contain one or more members selected from sulfur accelerators, metal oxides, and amino-alcohols. This novel gas-releasing composition permits the selectively tailoring of the gas evolution of a system in order to meet a wide range of specific application areas polymer characteristics and conditions over a wide temperature range.

4 Claims, No Drawings

GAS-RELEASING COMPOSITION FOR TAILORING GAS EVOLUTION OF SYSTEM IR 2811

BACKGROUND OF THE INVENTION

Chemical gas-releasing (blowing) agents, such as azodicarbonamide, p-toluenesulfonylhydrazide, p,p'-oxybis(benzenesulfonylhydrazide), and dinitrosopentamethylenetetramine, are well known in the art. These chemical blowing agents are generally solid compounds, which must be thermally decomposed in order to generate gaseous products and to facilitate, in a foaming process, the expansion needed for producing a cellular body. These blowing agents generally are useful over a limited temperature range.

Disadvantages of these commercial chemical blowing agents are that they generally must be thermally decomposed by heating to their specific decomposition temperature, and, subsequently, held for a specific length of time in order for gas-generation to occur. This gas-generation can provide the necessary expansion of a polymer medium which can result in the formation of a cellular body by one of the known processes, such as low pressure molding, high pressure molding, and continuous extrusion.

A disadvantage of thermally activated blowing agents is their limited useful temperature range and the difficulty in balancing the gas-generation or expansion with the correct fluidity-temperature relationship of the polymer matrix. The use of a specific chemical blowing agent outside of its decomposition range (for example, too high a temperature) will result in a poorly structured cellular body. Too low a temperature will yeild no gas-generation or expansion.

Tertiary-alkylhydrazinium salts and/or carbonylhydrazines have been used as blowing agents in foaming and crosslinking systems. U.S. Pat. No. 4,393,148 discloses the foaming and curing (crosslinking) of an unsaturated polyester resin at ambient temperatures using a peroxide curing agent, an iron or copper metal salt promoter, and a t-alkylhydrazinium salt blowing agent. U.S. Pat. No. 4,435,525 also discloses the foaming and curing of an unsaturated polyester resin at ambient temperatures using a carbonylhydrazine blowing agent. Published European patent application No. 0048050 discloses the foaming and curing of an unsaturated polyester resin using a t-alkyl hydrazine blowing agent.

SUMMARY OF THE INVENTION

The present invention is directed to a gas-generating composition consisting essentially of a t-alkylhydrazinium salt and/or carbonylhydrazine and at least one compound selected from free radical forming sources, metal oxides, and sulfur and/or sulfur donor compounds wherein when sulfur and/or a sulfur donor compound is used, the composition will also contain one or more members selected from sulfur accelerators, metal oxides, and amino-alcohols.

DETAILED DESCRIPTION OF THE INVENTION

The gas generation composition of the present invention can be independent of the system in which it produces the gas. In other words, the composition of the present invention can be inert to the environment in which it produces its gas and not affect the final product. On the other hand, especially when used as a gas generating composition for polymeric material, the composition of the present invention can be used to produce products having a wide variety of degrees of foaming and densities.

When the gas generating composition of the present invention includes a free radical forming agent, the gas generation is governed by the decomposition of the free radical forming agent either thermally or in certain cases by redox reaction. Although the free radical forming agents, i.e., organic peroxides and azos, are well known in the prior art, they have never been used in combination with other active compounds, i.e., t-alkylhydrazinium salts and carbonylhydrazines, as gas generating agents for temperature selective production of gas. These compositions activate (i.e., decompose) over a wide temperature range; therefore, custom tailored systems can be put together so that any characteristic of the product or process condition can be taken into consideration in order to obtain the desired result. Hence, the compositions of the present invention can be used in a large variety of systems over a wide temperature range where gas generation is required, such as, blowing agent for polymeric materials or aerosol sprays.

When the gas-generating composition of the present invention includes metal oxides, the metal oxides are selected from the group of zinc oxide, litharge (PbO), Red lead, and magnesium oxide.

When the gas-generating composition includes sulfur and/or sulfur donor compounds, the composition will also contain at least one compound selected from the group of sulfur accelerators and metal oxides. When the gas generating composition contains sulfur, the accelerator is selected from a sulfur donor compound, an amino-alcohol, a metal oxide, on aldehyde amine, or a guanidine. When the composition contains a sulfur donor compound, the sulfur accelerator is selected from an aldehyde amine, a guanidine, or a metal oxide. Sulfur donor compounds include thiazoles, sulfenamides, thiurams, and dithiocarbamates. Illustrative examples of these are benzothiazyl disulfide, 2-mercaptobenzothiazole, zinc 2-mercaptobenzothiazole, copper 2-mercaptobenzothiazole, zinc dimethyldithiocarbamate, copper dimethyldithiocarbamate, lead diamyldithiocarbamate, lead dimethyldithiocarbamate, zinc diethyldithiocarbamate, zinc diamyldithiocarbamate, bismuth dimethyldithiocarbamate, cadmium diamyldithiocarbamate, cadmium diethyldithiocarbamate, selenium diethyldithiocarbamate, selenium dimethyldithiocarbamate, tellurium diethyldithiocarbamate, tetraethylthiuram disulfide, ethylene thiourea, tetrabutylthiuram disulfide, tetramethylthiuram disulfide, tetramethylthiuram monosulfide, trimethylthiourea, 1,3-diethylthiourea, 1,3-dibutylthiourea, 4-morpholinyl-2-benzothiazole disulfide, n-tert-butyl-2-benzothiazolesulfenamide, and 2,5-dimercapto-1,3,4-thiadiazole monobenzoate.

t-Alkyl hydrazinium Salts and Carbonylhydrazines

The hydrazine derived compounds which form part of the novel composition of the present invention are t-alkylhydrazinium salts having the following general structure:

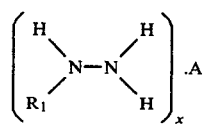

where x is an integer of 1, 2, 3, or 4 and A is an inorganic or organic acid; when x is 1, A is monoprotic acid; when x is 2, A is a diprotic acid; when x is 3, A is a triprotic acid; and when x is 4, A is a terprotic acid. $R_1$ is a tertiary alkyl radical of 4 to 8 carbons.

Examples of t-alkylhydrazinium salts include di-t-butylhydrazinium sulfate, t-butylhydrazinium bisulfate, t-butylhydrazinium chloride, mono-t-butylhydrazinium phosphate, t-butylhydrazinium benzoate, t-butylhydrazinium acetate, di-t-butylhydrazinium succinate, t-butylhydrazinium di-(2-ethylhexyl) phosphate, mono-t-butylhydrazinium oxalate, di-t-butylhydrazinium oxalate, t-butylhydrazinium neodecanoate, di-t-butylhydrazinium azelate, t-butylhydrazinium pivalate, t-butylhydrazinium p-toluenesulfonate, t-butylhydrazinium methanesulfonate, t-butylhydrazinium sulfonate, tetra-t-butylhydrazinium 1,2,4,5 benzenetetracarboxylate, di-t-butylhydrazinium terephthalate, mono t-butylhydrazinium dipicolinate, di-t-butylhydrazinium carbonate, t-butylhydrazinium sodium sulfate, t-butylhydrazinium malate, t-butylhydrazinium tributyl sulfate, and t-amylhydrazinium chloride.

Two of the most preferred compounds are t-butylhydrazinium chloride (t-BZ.HCl) and di-t-butylhydrazinium sulfate [(t-BZ)$_2$.H$_2$SO$_4$].

Compounds which are also useful in this invention are carbonylhydrazines having the following general structure:

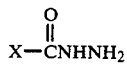

where x is selected from $R_1O-$, $R_2$,

and H$_2$NNH—; $R_1$ can be an alkyl of 1 to 20 carbons, a cycloalkyl of 5 to 12 carbons, an aralkyl of 7 to 18 carbons, an aryl of 6 to 18 carbons, and alkenyl of 2 to 20 carbons, an alkynyl of 2 to 20 carbons, or a 5 or 6 membered heterocyclic containing a nitrogen, sulfur, or oxygen atom in the ring. $R_2$ can be independently defined as $R_1$ or hydrogen; $R_3$ can be a covalent bond or a diradical selected from alkylene of 1 to 16 carbons, alkenylene of 2 to 16 carbons, alkynylene of 2 to 16 carbons, cycloalkylene of 5 to 16 carbons, arylene of 6 to 18 carbons, or aralkylene of 7 to 18 carbons; each of $R_1$, $R_2$, and $R_3$ can be branched or unbranched and optionally substituted with lower alkoxy, nitro, halogen, cyano, carboxy, hydroxy, lower acyloxy, aroyloxy, sulfo, lower alkoxycarbonyl, lower alkoxycarbonyloxy, N-substituted or unsubstituted carbamoyl and carbamoyloxy, lower thioalkoxy, lower thioacyloxy, lower dithioacyloxy, lower thioalkoxycarbonyl, lower dithioalkoxycarbonyl, lower thioalkoxycarbonyloxy, lower acyl, aroyl, and lower alkylsulfonato where lower alkyl includes 1 to 6 carbons; and $R_3$ can contain connective groups in the diradical backbone selected from the group consisting of

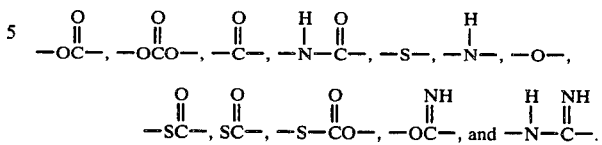

Examples of carbonylhydrazines of this invention include the following:

(1) Acid hydrazides such as formic, acetic, propionic, hexanoic, oleic, lauric, stearic, benzoic, toluic, furoic, eicosanoic, phenylacetic, cinnamic, mandelic, dihydrocinnamic, acetylsalicyclic, anthranilic, nitrobenzoic, chlorobenzoic, sulfobenzoic, thenoic, nicotinic, naphthoic, and crotonic hydrazide.

(2) Dibasic acid dihydrazides such as oxalic, malonic, succinic, glutaric, adipic, pimelic, suberic, azelaic, sebacic, maleic, fumaric, citraconic, phthalic, isophthalic, terephthalic, and tartaric dihydrazide.

(3) Carbazates such as methyl, ethyl, propyl, isopropyl, t-butyl, sec.-butyl, isobutyl, n-butyl, hexyl, octyl, decyl, hexadecyl, octadecyl, benzyl, phenethyl, octenyl, allyl, cyclohexyl, cyclopentyl, phenyl, naphthyl, thenyl, furyl, and propynyl carbazate.

(4) Carbohydrazide.

The preferred carbonylhydrazines are 2-furoic acid hydrazide, adipic acid dihydrazide, carbohydrazide, t-butyl carbazate, acetylhydrazide, toluic acid hydrazide, succinic acid hydrazide, and ethyl carbazate.

FREE RADICAL SOURCES

Suitable organic peroxides which are useful in the present invention include:

(1) Diacyl peroxides, such as dibenzoyl peroxide, diisobutyryl peroxide, acetyl peroxide, 2,4-dichlorobenzoyl peroxide, and lauroyl peroxide.

(2) Ketone peroxides, such as methyl ethyl ketone peroxide, 2,4-pentanedione peroxide, methyl isobutyl ketone peroxide and others.

(3) Peroxydicarbonates, such as di(n-propyl)peroxydicarbonate, di(sec-butyl)peroxydicarbonate, di(2-ethylhexyl)peroxydicarbonate, di(2-phenoxyethyl)peroxydicarbonate, and others.

(4) Peroxyesters, such as t-amylperoxy-2-ethylhexanoate, t-butylperoxy-2-ethylhexanoate, t-butylperoxyisobutyrate, t-butylperoxyacetate, t-butylperbenzoate, t-amylperbenzoate, and 2,5-dimethyl-2,5-bis(benzoylperoxy)hexane.

(5) Dialkyl peroxides, such as dicumyl peroxide, di-t-butyl peroxide, 2,5-dimethyl-2,5-bis(t-butylperoxy)hexyne-3, α,α'-di[(t-butylperoxy)isopropyl]benzene, t-butyl cumyl peroxide, 2,5-dimethyl-2,5-di(t-butylperoxy)hexane, and others.

(6) Peroxyketals, such as 1,1-di(t-butylperoxy)cyclohexane, 1,1-bis(t-butylperoxy) 3,3,5-trimethylcyclohexane, 2,2-bis(t-butylperoxy)butane, ethyl-3,3-di(t-butylperoxy)butyrate, 1,1-di(t-amylperoxy)cyclohexane, 2,2-di-t-amylperoxy propane, n-butyl 4,4-bis(t-butylperoxy)valerate, and others.

(7) Monoperoxycarbonates, e.g., OO-t-butyl-O-isopropyl monoperoxycarbonate, OO-t-butyl-O-(2-ethylhexyl) monoperoxycarbonate, and OO-t-amyl-O-(2-ethylhexyl) monoperoxycarbonate.

(8) Hydroperoxides such as t-butyl hydroperoxide, t-amyl hydroperoxide, cumene hydroperoxide, and 2,5-dimethyl-2,5-dihydroperoxyhexane.

A detailed description of these organic peroxides can be found in "Encyclopedia of Chemical Technology," 3rd Edition, Volume 17, pp. 27–90.

Mixtures of two or more peroxides may also be used within the scope of this invention.

Suitable azo compounds which can be incorporated into the present invention include symmetrical azos, such as 2,2-azobis(2-acetoxypropane), 2,2-azo-bis(2-propionoxypropane), 2,2-azo-bis(2-acetoxybutane), 2,2-azo-bis(2-acetoxy-4-methylpentane), and 2,2-azo-bis(2-propionoxy-4-methylpentane) or unsymmetrical azos, such as 2-t-butylazo-2-cyanobutane, 1-t-butylazo-1-cyanocyclohexane, 2-t-butylazo-2-methoxy-4-methylpentane, 1-t-amylazo-1-cyanocyclohexane, and 2-t-butylazo-2,4-dimethylpentane.

The levels of the components of the compositions of this invention are highly dependent upon the desired result, i.e., as an aerosol the amount of gas to be generated or as a blowing agent the cellular structure to be produced. Important considerations include polymer type, processing conditions, the desired density reduction (if crosslinking or vulcanization is desired) and the cellular structure.

In the novel composition of the present invention the t-alkylhydrazinium salt or carbonylhydrazine component constitutes 1–70% preferably 5–60%, and most preferably 10–55%, by weight of the mixture. The free radical source component selected from an organic peroxide, azo compound, or carbon-carbon initiator constitutes 30–99%, preferably 40–95%, and most preferably 45–90%, of the mixture. The metal oxide source component constitutes from about 45–99%, preferably 45–90%, and most preferably 45–80%, by weight of the mixture. The sulfur and/or sulfur donor source component (when the sulfur donor compound is not used as an accelerator) constitutes about 5–55%, preferably 10–45%, and most preferably 10–40%, by weight of the mixture. The concentration of the accelerator component selected from sulfur donor compounds, amino alcohols, guanidines, aldehyde amine and metal oxides constitutes from about 40–90%, preferably 45–85%, and most preferably 45–80%, by weight of the mixture. The exact amount of the components which will yield the desired result can be determined theoretically based on the knowledge of the system.

When the composition of the present invention is used as blowing agents for polymers, the specific polymer and the processing conditions of the system are significantly important for selecting the components of the compositions using thermal stability, time when gas generation occurs, mixing techniques, etc. as criteria. Significantly important is also the required density reduction. Depending on the desired density reduction, compositions of the present invention are used at a level from about 1% to about 15% by weight bases on the polymer.

This gas-releasing composition, along with other embodiments of the composition, after being thoroughly blended/mixed by one of the current industry practices (i.e., banbury, mill, or extruder mixing) will produce a composition whereupon heating will effectuate expansion, thus producing a foam. This process can be any of the typical processes, such as low pressure molding, high pressure molding, and continuous extrusion.

Typical operating temperatures are within the range of 25° C. to 400° C., preferably 30° C. to 350° C., most preferably 50° C. to 350° C.

To facilitate compounding and/or control costs other additives such as oils, plasticizers, and fillers can be incorporated. For ease of handling gas generating compositions of the present invention can also be masterbatched in suitable carriers.

POLYMER MEDIUMS

The polymeric mediums which the gas generation composition of the present invention find utility are defined as natural or synthetic materials which are thermoplastic, thermoset, or elastomeric in nature. Thermoplastics are materials whose glass transition temperatures are above ambient temperatures and which are capable of undergoing indefinite inelastic deformation at elevated temperatures, with no significant amount of chemical decomposition. Examples of such are acrylonitrile-butadiene-styrene (ABS) polymers, olefin-modified styrene-acrylonitrile polymers, acetal homopolymers and copolymers, acrylic resins, fluoroplastics, nitrile resins, nylon or polyamide resins, polyamide-imide resins, polybutylene resins, polycarbonate resins, polyarylate polymers, polybutylene terephthalate, polytetramethylene terephthalate, polyethylene terephthalate, polyetherimide, polyetheretherketone, low density polyethylene, high density polyethylene, linear low density polyethylene, high molecular weight high density polyethylene, ultra high molecular weight polyethylene, ethylene acid copolymer, ethylene-ethyl acrylate copolymers, ethylene methyl acrylate copolymers, ethylene-vinyl acetate copolymers, aromatic thermoplastic polyimides, polymethylpentene, modified polyphenylene oxide polymers, modified polyphenylene ether polymers, polyphenylene sulfide, polypropylene, polystyrene (crystal and impact grade), polyvinyl chloride, vinylidene chloride copolymers, styrene-acrylonitrile resins, polysulfone, polyarylsulfone, polyethersulfone, and thermoplastic elastomers.

Thermoset polymers or resins are materials that have undergone or will undergo a chemical reaction by action of heat, catalysts, ultraviolet light, etc. leading to an infusible and insoluble state and which cannot be reformed by heat after reaching full cure. Examples of such are amino resins, epoxy resins, furan polymers, phenolic resins, thermoset polyimides, and polyurethane polymers.

More detailed description of both thermoplastic and thermoset polymers or resins can be found, and subsequently incorporated by reference, in *Modern Plastics Encyclopedia*, Volume 61, Number 10A, 1984–85 edition, McGraw-Hill Publications Company, pages 6–102.

In addition, blends of two or more thermoplastic materials can be used in this invention. Examples of such are polyphenylene oxide/polystyrene, ABS/polycarbonate (PC), PC/polyethylene terephthalate (PET), PC/polybutylene terephthalate (PBT), PET/PBT, polyvinyl chloride/ABS, polyvinyl chloride/polyethylene, polypropylene/ethylene vinyl acetate, polyethylene/polypropylene and high density polyethylene/linear low density polyethylene.

Also, elastomers blended with various thermoplastics can be used in this invention. Elastomers are materials whose glass transition temperature is below ambient temperature and which at room temperature can be stretched repeatedly to twice its original length where upon its release, return approximately to its original length. In the scope of the present invention, these elastomers include natural rubber, ethylene-propylene terpolymers, ethylene-propylene copolymers, styrene-butadiene rubbers, polybutadiene, butyl rubber, chlorinated butyl rubber, brominated butyl rubber, synthetic polyisoprene nitrile rubber, polyacrylate rubbers, neoprene, chlorosulfonated polyethylene, polysulfide rubbers, chlorinated polyethylene silicone rubbers fluoroelastomers, and urethane elastomers.

Examples of thermoplastic-elastomer blends are ethylene-propylene terpolymer (EPDM/polypropylene, EPDM/polyethylene (PE), chlorinated polyethylene/-nylon, ethylene-propylene copolymer (EPM)/polypropylene (PP), EPM/PE, EPDM/EPM/PP, EPDM/EPM/PE, nylon/nitrile rubber, EPDM/PP/PE, and EPM/PP/PE.

ADDITIVES TO MEDIUM

The density of the cellular body can be controlled by the amount of reactants employed. In addition to the above, it is well known to those skilled in the art that a composition may include fillers, such as carbon black, clays, the alkaline earth metal carbonates, titanium dioxide, hollow ceramic, glass, or graphite spheres. It is also well known in the art that compositions may also contain antioxidants, stabilizers, plasticizers, processing oils, and processing aids.

In some cases, certain volatile compounds, which have boiling points such that the liquids vaporize during the cellular producing process can also be used to enhance foaming. Representative examples of useful compounds include water, n-heptane, cyclohexane, 1-heptane, and toluene. In some cases commercial chemical blowing agents such as azodicarbonamide, para-toluenesulfonylhydrazine, p,p'-oxybis(benzenesulfonyl-hydrazide), or dinitrosopentamethylenetetramine can also be used to enhance foaming.

In certain cases it may be useful to add surfactants to the resin medium to promote uniformity of cell size in the final product. Such surfactants may be of the cationic (quarterary salts), anionic (sulfonates), and nonionic (ethylene oxide condensates) type. Some suitable surfactants include materials such as: metallic soaps, alkylene oxide-phenol addition products, alkyl aryl sulfates and sulfonates, dimethyl siloxane polymers, and cationic siloxanes of the general formula shown in U.S. Pat. No. 3,642,670 which are herein incorporated by reference. Air will also serve as a nucleating agent.

DATE ON GAS GENERATION

As a method of determining gas evolution, numerous tests have been made. These tests were made by using various weights of the novel gas generations compositions which were placed in a stoppered tube, communicating with one leg of a calibrated U-tube containing mercury, and place in a bath maintained at the test temperature.

EXAMPLE 1

This example illustrates nov̇el gas generating compositions using a t-alkylhydrazinium salt as one component while the second component being of sulfur, zinc oxide, and, if desired, additional sulfur bearing compounds, normally referred to as sulfur accelerators.

TABLE I

| Compositions[1] Components | Grams | | | | | | | | |
|---|---|---|---|---|---|---|---|---|---|
| | A | B | C | D | E | F | G | H | I |
| Zinc Oxide | .03 | — | — | .04 | .03 | .03 | .03 | .03 | .03 |
| Sulfur | .02 | — | .02 | — | .02 | — | .02 | .02 | .02 |
| Zinc Stearate | .01 | — | — | — | — | .01 | .01 | .01 | .01 |
| Benzothiazyl Disulfide | .01 | — | — | — | — | — | — | .01 | .01 |
| Zinc Dimethyldithiocarbamate | .01 | — | — | — | — | .01 | .01 | .01 | .01 |
| Copper Dimethyldithiocarbamate | .005 | — | — | — | — | — | — | — | .005 |
| t-BZ.HCl | — | .04 | .03 | .04 | .03 | .03 | .03 | .03 | .03 |
| Gas Evolved[2] (cc) STP | 0.75 | .18 | .36 | 1.44 | 4.77 | 2.34 | 5.13 | 6.12 | 6.93 |
| Gas evolved (cc/g of t-BZ.HCl) STP | — | 4 | 12 | 36 | 159 | 78 | 171 | 179 | 206 |

[1] all of the above compositions were suspended in 2 ml of dioctyl phthalate
[2] Bath temperature was 150° C.

Column E indicates significant gas generation when sulfur, zinc oxide, and t-BZ.HCl were used. Incorporating sulfur accelerators such as zinc dimethyldithiocarbamate and/or copper dimethyldithiocarbamate into the composition yielded increased gas evolution as shown in column H and column I. The cc/gram of t-BZ.HCl reported was the amount of additional gas evolved after the controls, where appropriate, were subtracted from the total gas produced by the composition.

EXAMPLE 2

This example illustrates a gas generating composition of a t-butylhydrazinium salt and a metal oxide-sulfur and sulfur donor mixture.

TABLE II

| Composition[1] Components | Grams | | |
|---|---|---|---|
| | A | B | C |
| Zinc oxide | .05 | — | .05 |
| Magnesium oxide | .04 | — | .04 |
| Stearic acid | .01 | — | .01 |
| TMTM[2] | .01 | — | .01 |
| Sulfur | .01 | — | .01 |
| t-BZ.HCl | — | .04 | .03 |
| Gas evolved[3] (cc) STP | .54 | .18 | 4.50 |
| Gas evolved (cc/g of t-BZ.HCl) STP | — | 4 | 133 |

[1] all of the above compositions were suspended in 2 ml of dioctyl phthalate.
[2] TMTM is tetramethylthiuram monosulfide
[3] Bath temperature was 150° C.

Column C indicates significant gas evolution using the gas generating composition. The cc/gram of t-BZ.HCl reported was the amount of additional gas evolved after the controls, where appropriate, were subtracted from the total gas produced by the composition.

EXAMPLE 3

This example illustrates a gas generating composition which consists of zinc oxide, magnesium oxide, ethylene thiourea, and a t-alkylhydrazinium salt.

TABLE III

| Composition[1] | Grams | | |
|---|---|---|---|
| Components | A | B | C |
| Zinc oxide | .05 | — | .05 |
| Magnesium oxide | .04 | — | .04 |
| Ethylene thiourea | .005 | — | .005 |
| t-BZ.HCl | — | .04 | .03 |
| Gas evolved[2] (cc) STP | .63 | .18 | 1.98 |
| Gas evolved (cc/g of t-BZ.HCl) STP | — | 4 | 45 |

[1] all of the above compositions were suspended in 2 ml of dioctyl phthalate.
[2] Bath temperature was 150° C.

Column C indicates increased gas evolution using the novel gas generating composition. The cc/gram of t-BZ.HCl reported was the amount of additional gas evolved after the controls, where appropriate, were subtracted from the total gas produced by the composition.

EXAMPLE 4

This example illustrates that by varying the ratio of organic peroxide to the t-alkylhydrazinium salt, various levels of gas evolution occurs. This is readily demonstrated in the following Table IV:

Column B shows that virtually no gas was evolved from t-BZ.HCl. However, columns C through G indicate that the mixture of an organic peroxide and a t-alkylhydrazinium salt yield gas generation that is greater than just from the organic peroxide (column A), thus, this is attributable to the t-alkylhydrazinium salt. Varying ratios of organic peroxide to the t-alkylhydrazinium salt results in a varying degree of gas evolution as indicated by the changing values of cc/g of t-BZ.HCl. Higher efficiency (cc/g of t-BZ.HCl) was obtained when the peroxide was the major component.

Low levels of peroxide resulted in an incomplete reaction leaving an excess of t-alkylhydrazinium salt which does not react; hence, this lowered the efficiency of the mixture. Also, it was observed that gas evolution occured much faster using the novel compositions of this invention than the organic peroxide alone (column A). This is indicated by the data shown under the time for 50% gas evolved.

EXAMPLE 5

This example illustrates admixtures using a t-BZ.HCl and various diperoxyketal organic peroxides as novel gas-evolving compositions as shown in Table V, infra.

TABLE IV

| Compositions | A | | B | | C | | D | | E | | F | | G | |
|---|---|---|---|---|---|---|---|---|---|---|---|---|---|---|
| Components | grams | % | grams | % | grams | % | grams | % | grams | % | grams | % | grams | % |
| Lupersol 231* | .0233 | 100 | — | — | .0500 | 90.7 | .0385 | 71.0 | .0167 | 55.4 | .0164 | 35.9 | .0103 | 12.0 |
| t-BZ.HCl | — | — | .0437 | 100 | .0051 | 9.3 | .0157 | 29.0 | .0134 | 44.6 | .0293 | 64.1 | .0758 | 88.0 |
| Gas evolved (cc) STP | 3.81 | | 0 | | 8.73 | | 8.01 | | 4.28 | | 5.31 | | 3.29 | |
| Time for 50% gas evolved (sec.) | 125 | | — | | 45 | | 40 | | 25 | | 45 | | 65 | |
| Gas evolved** (cc/g of t-BZ.HCl) STP | — | | 0 | | 109 | | 137 | | 116 | | 90 | | 21 | |

*[1,1-bis(t-butylperoxy)3,3,5-trimethylcyclohexane] from Pennwalt Corporation
**Bath temperature was 140° C.

TABLE V

| Composition | Grams | | | | | |
|---|---|---|---|---|---|---|
| Components | A | B | C | D | E | F |
| Lupersol 331* | .0260 | .0334 | — | — | — | — |
| Lupersol 230** | — | — | .0358 | .047 | — | — |
| Lupersol 233 M090*** | — | — | — | — | .0335 | .0324 |
| t-BZ.HCl | — | .0110 | — | .0198 | — | .0097 |
| Bath Temp. (°C.) | 140 | 140 | 140 | 140 | 150 | 150 |
| Gas evolved (cc) STP | 5.85 | 7.92 | 5.72 | 10.84 | 5.76 | 7.61 |
| Time for 50% Gas Evolved (sec.) | 50 | 30 | 270 | 30 | 255 | 90 |
| Gas Evolved (cc/g of t-BZ.HCl) STP | — | 37 | — | 168 | — | 210 |

*1,1-bis(t-butylperoxy)cyclohexane available from Pennwalt Corp.
**n-butyl 4,4-bis(t-Butylperoxy)valerate available from Pennwalt Corp.
***90% active ethyl 3,3-di(t-butylperoxy)butyrate in odorless mineral spirits available from Pennwalt Corp.

EXAMPLE 6

This example illustrates admixtures using a t-alkylhydrazinium salt and various dialkyl organic peroxides as novel gas-evolving compositions as shown in Table VI, infra.

EXAMPLE 7

This example illustrates compositions which combine sulfur, t-BZ.HCl, and other compounds which can be classified as accelerator activators as shown in Table VII infra.

TABLE VI

| Compositions | Grams | | | | | | | | | |
|---|---|---|---|---|---|---|---|---|---|---|
| Components | A | B | C | D | E | F | G | H | I | J |
| Luperox 500R[a] | 0.0498 | 0.0530 | 0 | 0 | 0 | 0 | 0 | 0 | 0 | 0 |
| Lupersol 801[b] | 0 | 0 | 0.0464 | 0.0354 | 0 | 0 | 0 | 0 | 0 | 0 |
| Luperox 802[c] | 0 | 0 | 0 | 0 | 0.0500 | 0.0319 | 0 | 0 | 0 | 0 |
| Lupersol 101[d] | 0 | 0 | 0 | 0 | 0 | 0 | 0.0371 | 0.0308 | 0 | 0 |
| Lupersol 130[e] | 0 | 0 | 0 | 0 | 0 | 0 | 0 | 0 | 0.0579 | 0.0259 |
| t-BZ.HCl | 0 | 0.0152 | 0 | 0.0110 | 0 | 0.0081 | 0 | 0.0129 | 0 | 0.0063 |
| Bath Temperature (C) | 150 | 150 | 150 | 150 | 160 | 160 | 150 | 150 | 160 | 160 |
| Gas evolved (cc) STP | 4.73 | 6.98 | 5.36 | 5.22 | 8.91 | 7.38 | 5.81 | 6.21 | 10.08 | 5.36 |
| Time for 50% Gas Evolved (sec.) | 340 | 250 | 305 | 255 | 120 | 85 | 235 | 175 | 368 | 145 |

TABLE VI-continued

| Compositions | Grams | | | | | | | | | |
|---|---|---|---|---|---|---|---|---|---|---|
| Components | A | B | C | D | E | F | G | H | I | J |
| Gas Evolved (cc/g of | 0 | 128 | 0 | 103 | 0 | 209 | 0 | 107 | 0 | 135 |

[a] Dicumyl Peroxide available from Pennwalt Corp.
[b] t-Butyl Cumyl Peroxide available from Pennwalt Corp.
[c] α,α'-Di[(t-butylperoxy)isopropyl]benzene available from Pennwalt Corp.
[d] 2,5-Dimethyl-2,5-di(t-butylperoxy)hexane available from Pennwalt Corp.
[e] 2,5-Dimethyl-2,5-di(t-butylperoxy)hexyne-3 available from Pennwalt Corp.

TABLE VII

| Compositions[2] | Grams | | | | | | | | | | |
|---|---|---|---|---|---|---|---|---|---|---|---|
| Components | A | B | C | D | E | F | G | H | I | J | K |
| t-BZ.HCl | 0.04 | 0.03 | 0.03 | 0.03 | 0.03 | 0.03 | 0.03 | 0.03 | 0.03 | 0.03 | 0.03 |
| Sulfur | 0 | 0.02 | 0.02 | 0 | 0.02 | 0 | 0.02 | 0 | 0.02 | 0 | 0.02 |
| Magnesium oxide | 0 | 0 | 0.1 | 0 | 0 | 0 | 0 | 0 | 0 | 0 | 0 |
| Litharge (PbO) | 0 | 0 | 0 | 0.1 | 0.1 | 0 | 0 | 0 | 0 | 0 | 0 |
| Red Lead (Pb$_3$O$_4$) | 0 | 0 | 0 | 0 | 0 | 0.1 | 0.1 | 0 | 0 | 0 | 0 |
| diethanolamine | 0 | 0 | 0 | 0 | 0 | 0 | 0 | 0.1 | 0.1 | 0 | 0 |
| triethanolamine | 0 | 0 | 0 | 0 | 0 | 0 | 0 | 0 | 0 | 0.1 | 0.1 |
| Gas Evolved[1] (cc/g of t-BZ.HCl) STP | 4 | 12 | 89 | 90 | 176 | 130 | 205 | 30 | 160 | 5 | 112 |

[1] Bath Temperature was 150° C.
[2] all above compositions were suspended in 2 ml dioctyl phthalate.

The results (in Table VII) show that substantial increases in gas evolution were obtained with the addition of magnesium oxide, litharge, red lead, diethanolamine or triethanolamine to the composition of t-BZ.HCl and sulfur.

EXAMPLE 8

This example illustrates that various levels of gas evolution were obtained when the ratio of accelerator activator, Pb$_3$O$_4$, to the t-alkylhydrazinium salt was varied.

TABLE VIII

| Composition[2] | Grams | | |
|---|---|---|---|
| Components | A | B | C |
| t-BZ.HCl | .03 | .03 | .03 |
| Sulfur | .02 | .02 | .02 |
| Red Lead (Pb$_3$O$_4$) | .01 | .05 | 0.1 |
| Gas Evolved[1] (cc/g of t-BZ.HCl) STP | 39 | 170 | 205 |

[1] Bath Temperature was 150° C.
[2] all above compositions were suspended in 2 ml dioctyl-phthalate

EXAMPLE 9

This example illustrates the affect of various sulfur accelerators on the t-alkylhydrazinium salt and sulfur mixture as shown in Table IX, infra.

TABLE IX

| Composition | Grams | | | | | | | |
|---|---|---|---|---|---|---|---|---|
| Components | A | B | C | D | E | F | G | H |
| t-BZ.HCl | 0.03 | 0.03 | 0.03 | 0.03 | 0.03 | 0.03 | 0.03 | 0.03 |
| Sulfur | 0.02 | 0.02 | 0.02 | 0.02 | 0.02 | 0.02 | 0.02 | 0.02 |
| Zinc dimethyldithiocarbamate | 0 | 0.1 | 0 | 0 | 0 | 0 | 0 | 0 |
| Copper dimethyldithiocarbamate | 0 | 0 | 0.1 | 0 | 0 | 0 | 0 | 0 |
| Benzothiazyl disulfide | 0 | 0 | 0 | 0.1 | 0 | 0 | 0 | 0 |
| Tetramethylthiuram disulfide | 0 | 0 | 0 | 0 | 0.1 | 0 | 0 | 0 |
| Zinc 2-mercaptobenzothiazole | 0 | 0 | 0 | 0 | 0 | 0.1 | 0 | 0 |
| Copper 2-mercaptobenzothiazole | 0 | 0 | 0 | 0 | 0 | 0 | 0.1 | 0 |
| 4-morpholinyl-2-benzothiazole disulfide | 0 | 0 | 0 | 0 | 0 | 0 | 0 | 0.1 |
| Gas evolved[1] (cc/g of t-BZ.HCl) STP | 12 | 16 | 37 | 131 | 45 | 48 | 20 | 75 |

[1] Bath Temperature was 150° C.
[2] all of the above compositions were suspended in 2 ml of dioctyl phthalate.

EXAMPLE 10

This example illustrates admixtures using t-butylhydrazinium chloride and various azo iniators as novel gas-evolving compositions as shown in Table X below.

TABLE X

| Compositions[1] | Grams | | | | | | | |
|---|---|---|---|---|---|---|---|---|
| Components | A | B | C | D | E | F | G | H |
| t-BZ.HCl | — | .01 | — | .01 | — | .01 | — | .01 |
| 2,2-azobis(2-methylbutyronitrile) | .02 | .05 | — | — | — | — | — | — |
| 1,1$^1$-azobis(cyclohexanecarbonitrile) | — | — | .02 | .05 | — | — | — | — |
| 2-t-butylazo-2-cyanopropane | — | — | — | — | .0283 | .0515 | — | — |
| azoisobutyrolnitrile | — | — | — | — | — | — | .02 | .05 |
| Bath temperature (°C.) | 130 | 130 | 130 | 130 | 140 | 140 | 140 | 140 |
| Gas evolved (cc) STP | 2.07 | 6.48 | 1.71 | 4.95 | 2.79 | 6.93 | 2.61 | 6.57 |

TABLE X-continued

| Compositions[1] | Grams | | | | | | | |
|---|---|---|---|---|---|---|---|---|
| Components | A | B | C | D | E | F | G | H |
| Gas evolved (cc/g of t-BZ.HCl) STP | 0 | 131 | 0 | 68 | — | 185 | — | 4.5 |

[1] all above compositions were suspended in 2 ml of dioctyl phthalate.

EXAMPLE 11

Exemplifying elevated temperature formation of cellular bodies, a 300 grams sample was used of a high-impact, high heat resistant styrene-maleic anhydride resin (Dylark ® 250 from Arco Polymers, Inc.) having a specific gravity of 1.06 and a melt index of 1.0 g/10 min., condition "L" in the form of ⅛" pellets. A well mingled mixture was formed, including a major proportion, namely 300 grams of this rubber modified styrene-maleic anhydride resin, with which was incorporated by tumbling a minor proportion, namely 1.5 grams of liquid 2,5-dimethyl-2,5-di(t-butylperoxy)hexane (Lupersol®101, Pennwalt Corp.) which wetted and coated the resin pellets uniformly. Then, three (3.0) grams of di-(t-butylhydrazinium) terephthalate were added to the mixture and incorporated therein by tumbling. 15 grams of pyrogenic silica (Cab—O—Sil, M-5, from Cabot Corporation) is then mixed into the mixture.

The mixture was then charged into a 1¼" C. W. Brabender extruder having a 25:1 ratio of length to diameter. While in the extruder, the mixture was confined within the extruder barrel, head and extruder die until the shaped body was extruded from the die orifice. Extrusion was carried out under the following set of parameters:

| Extruder barrel | Zone 1 | Temperature | 200° C. |
|---|---|---|---|
| Extruder barrel | Zone 2 | Temperature | 200° C. |
| Extruder barrel | Zone 3 | Temperature | 210° C. |
| Extruder barrel | Zone 4 | Temperature | 210° C. |
| Extruder die | | Temperature | 210° C. |
| Extruder screw speed | | 20 rpm | |

The extruded cellular body thus produced had a closed cell structure upon visual inspection, and a density of 37.4 lbs/ft³. In the absence of the gas generation composition, no foaming was observed under the same extrusion conditions and the extrudate had a density of 60.8 lbs/ft³.

EXAMPLE 12

The procedure of Example 11 was repeated, except that 3.0 grams of t-butylhydrazinium chloride was used instead of 3.0 grams of di(t-butylhydrazinium)terephthalate and, as illustrated in the example table, various organic peroxides were used instead of 2,5-dimethyl 2,5-di(t-butylperoxy)hexane. Extrusion was carried out under the following set of parameters:

| Extruder barrel | Zone 1 | Temperature | 180° C. |
|---|---|---|---|
| Extruder barrel | Zone 2 | Temperature | 180° C. |
| Extruder barrel | Zone 3 | Temperature | 180° C. |
| Extruder barrel | Zone 4 | Temperature | 180° C. |
| Extruder die | | Temperature | 180° C. |
| Extruder screw speed | | 20 rpm | |

The resulting foam densities are shown in the following example Table I:

TABLE XI

| Organic Peroxide | Density (lb/ft³) |
|---|---|
| 1,1-bis(t-butylperoxy)3,3,5-trimethylcyclohexane[1] | 30.4 |
| n-butyl 4,4-bis(t-butylperoxy)valerate[2] | 37.2 |
| Dicumyl Peroxide[3] | 39.3 |
| 2,5-dimethyl-2,5-di(t-butylperoxy)hexyne-3[4] | 40.1 |
| ethyl 3,3-di(t-butylperoxy)butyrate[5] | 31.2 |
| α,α'-bis[(t-butylperoxy)isopropyl]benzene[6] | 34.7 |

[1] Lupersol 231 - available from Pennwalt Corp.
[2] Lupersol 230 - available from Pennwalt Corp.
[3] Luperox 500R - available from Pennwalt Corp.
[4] Lupersol 130 - available from Pennwalt Corp.
[5] Lupersol 233M090 - available from Pennwalt Corp.
[6] Vulcup R - available from Hercules, Inc.

EXAMPLE 13

The procedure of Example 11 was repeated but 3.0 grams of t-butylhydrazinium chloride was used instead of 3.0 grams of di(t-butylhydrazinium)terephthalate and the combination of 1.5 grams Echo-S (monobenzoate derivative of 2,5-dimercapto-1,3,4-thiadiazole available from Hercules, Inc.)/0.6 grams of Harwick Accelerator 832 (reaction product of butyraldehyde and aniline, available from Harwick Chemical Corporation) was used instead of 1.5 grams of 2,5-dimethyl-2,5-di(t-butylperoxy)hexane. Extrusion was carried out under the following set of parameters:

| Extruder barrel | Zone 1 | Temperature | 180° C. |
|---|---|---|---|
| Extruder barrel | Zone 2 | Temperature | 180° C. |
| Extruder barrel | Zone 3 | Temperature | 180° C. |
| Extruder barrel | Zone 4 | Temperature | 180° C. |
| Extruder die | | Temperature | 180° C. |
| Extruder screw speed | | 20 rpm | |

The resulting foam had a density of 54.3 lbs/ft³.

EXAMPLE 14

The procedure of Example 11 was used similarly herein with a polypropylene (PP) resin. A 300 grams sample of PP (Pro-Fax ®6323, Hercules, Inc.), having a specific gravity of 0.903 and a melt index of 12 was tumbled with 1.5 grams of 2,2'-azobis(2-acetoxypropane) (LUAZO ® AP, Pennwalt Corp.), a solid, whereas no wetting of the resin pellets occurred, then with 3.0 grams of di(t-butylhydrazinium) terephthalate, then with 15 grams of pyrogenic silica. This mixture was extruded under the following parameters:

| Extruder barrel | Zone 1 | Temperature | 190° C. |
|---|---|---|---|
| Extruder barrel | Zone 2 | Temperature | 190° C. |
| Extruder barrel | Zone 3 | Temperature | 195° C. |
| Extruder barrel | Zone 4 | Temperature | 200° C. |
| Extruder die | | Temperature | 200° C. |
| Extruder screw speed | | 20 rpm | |

The extrudate expanded to give a foamed PP resin of closed cell structure having a density of 28.9 lbs/ft³. In the absence of the gas generating composition, no foaming occurred and the extrudate had a density of 55.8 lbs/ft$^3$.

EXAMPLE 15

In another modification of the method of making cellular bodies, a masterbatch was first prepared which was made up of ethylene-propylene terpolymer (EPDM) and the gas generating composition under compounding conditions which did not activate the gas-releasing material. A 240 grams sample of an EPDM (Polyester EPDM 346, from Polysar, Inc.) having a specific gravity of 0.86 and a Mooney Viscosity [ML1+8(100° C.)] of 27–30 was charged into a room temperature C. W. Brabender prep-center mixer with roller type blades. The mixer was at a speed of 30 rpm. Once the EPDM was fluxed, 24 grams of t-butylhydrazinium chloride were added slowly, then 24 grams of zinc oxide were added slowly, then 12 grams of Compounder's sulfur were added to produce a masterbatch composition. The composition was allowed to mix, then was removed from the mixer, and subsequently allowed to cool to room temperature. Once cooled, the masterbatch was granulated into about ⅛" pellets using a C. W. Brabender Lab Granu-Grinder.

To produce the mixture a 225 grams sample of low density polyethylene (PE-102 from Rexene Polyolefins Co.), having a specific gravity of 0.921 and a melt index of 1.0 was tumbled with 75.0 grams of the above masterbatch, then with 15.0 grams of the previously described EPDM. The mixture was then extruded, following the procedure discussed herein under Example 11, under the following extrusion parameters:

| | | | |
|---|---|---|---|
| Extruder barrel | Zone 1 | Temperature | 150° C. |
| Extruder barrel | Zone 2 | Temperature | 150° C. |
| Extruder barrel | Zone 3 | Temperature | 160° C. |
| Extruder barrel | Zone 4 | Temperature | 165° C. |
| Extruder die | | Temperature | 170° C. |
| Extruder screw speed | | 30 rpm | |

The extrudate expanded to give a foamed thermoplasticelastomeric polymer blend of closed cell structures having a density of 20.8 lbs/ft$^3$. In the absence of the gas generating composition incorporated through the masterbatch, a control consisting of 225 grams of low density polyethylene and 75 grams of EPDM was prepared and extruded under the same procedure and conditions described above; no foaming occurred and the extrudate had a density of 54.9 lbs/ft$^3$.

EXAMPLE 16

This example illustrates the effectiveness of a gas generating composition of the present invention in producing a polyurethane elastomer foam. The procedure was to initially preheat to 100° C. the polyurethane liquid isocyanate terminated prepolymer (Vibrathane B-615 from Uniroyal Chemical), having a percent of NCO of 4.80–5.20 herein referred to as Part A. Also, preheated to 100° C. were the 4,4'-methylene-bis(2-chloroaniline)[Curene ® 3005 from Anderson Development Co., Inc.] and trimethylolpropane (from Celanese Chemical Co., Inc.). A blend of 4,4'-methylene-bis(2-chloroaniline) and trimethylolpropane was then prepared at the ratio of 24.2 parts per one hundred parts by weight of Part A of 4,4'-methylene-bis(2-chloroaniline) and 1.3 parts per one hundred parts by weight of Part A of trimethylolpropane. This blend is herein referred to as Part B. At room temperature a blend of t-butyl hydrazinium chloride and surfactant (DC-193 from Dow Corning) at the specific ratio of the parts per one hundred parts by weight Part A shown in the table below; this blend is herein referred to as Part C. The free radical source, 2,5-dimethyl-2,5-bis(2-ethylhexanoylperoxy)-hexane [Lupersol ® 256, from Pennwalt Corp.], was then added to Part C at the desired parts per one hundred parts by weight of Part A as shown in the table below.

Part A and Part B were hand mixed in a small beaker with a glass stirring rod for approximately 30 seconds. Part C was then added. The mixture was then mixed with the glass stirring rod for approximately two minutes, after which the sample was poured into a glass jar and cured at 100° C. for two hours in a circulating air oven.

The following Table XII illustrates the use of the present invention in foaming polyurethanes:

TABLE XII

| Composition | Parts by Weight | | | |
|---|---|---|---|---|
| Components | A | B | C | D |
| Part A | 100 | 100 | 100 | 100 |
| Part B | 25.5 | 25.5 | 25.5 | 25.5 |
| Surfactant | 2.5 | 2.5 | 2.5 | 2.5 |
| t-butylhydrazinium chloride | — | 2.0 | — | 2.0 |
| Lupersol ® 256 | — | — | 1.0 | 1.0 |
| Density (lbs/ft$^3$) | 64.0 | 64.0 | 56.0 | 42.0 |

The results show that t-butylhydrazinium chloride by itself yields no foaming (column B). Lupersol 256 did yield a slight density reduction. However, upon visual inspection, random voids were noticed in the sample (column C). Column D yielded a significant density reduction and which upon visual inspection had uniformly foamed cellular structure.

EXAMPLE 17

The procedure of Example 16 was repeated except that 2.0 parts of Lupersol ® DDM-9 (a methyl ethyl ketone peroxide containing 9% active oxygen available from Pennwalt Corp.) were used instead of Lupersol ® 256 in the gas generating composition of Column D in the example table. A foamed polyurethane elastomer having a uniform closed-cell structure upon visual inspection and having a density of 31.0 lbs/ft$^3$ was obtained.

EXAMPLE 18

The elastomer formulation was compounded using the C. W. Brabender Plasti-corder mixer with roller-5 type blades. The mixer was at ambient temperature (no preheating). The components of carbon black, calcium carbonate, and processing oil were weighed at the desired parts by weight of elastomer into a 3-ounce waxed paper cup and mixed using a small metal spatula. The components, organic peroxide and carbonylhydrazine compound, were then weighed at the desired parts by weight elastomer into the waxed paper cup and mixed using a small metal spatula. The specific parts per 100 parts of polymer are listed in the following Table XIII.

100 parts by weight of polymer were fluxed in the C. W. Brabender Plasti-corder at a mixing speed of 30 rpm. The contents of the cup were then slowly added to the fluxing polymer. The composition was allowed to mix for three (3) minutes. The entire composition was then removed from the mixer and subsequently pressed into a flat plaque (no specific thickness) using a room temperature Carver Laboratory Press (Model C). The flat sheet was then allowed to cool to room temperature.

This example illustrates the effectiveness of various carbonylhydrazines in combination with an organic peroxide in producing a crosslinked sponge. The sponge producing procedure was to use enough of the specific compounded composition to press out, at 143° C. in a Carver Laboratory Press (Model C), a thin 3.375" sheet. The molding pressure was held for 20 seconds. The pressure was then released and the sheet was removed and placed in a circulating air oven for 20–26 minutes at 143° C. to rise and cure.

TABLE XIII

| Compositions | Parts by Weight | | | | | |
|---|---|---|---|---|---|---|
| | A | B | C | D | E | F |
| Polysar 346 EPDM[a] | 100 | 100 | 100 | 100 | 100 | 100 |
| N-330[b] | 40 | 40 | 40 | 40 | 40 | 40 |
| Atomite 319[c] | 70 | 70 | 70 | 70 | 70 | 70 |
| Sunpar 2280[d] | 35 | 35 | 35 | 35 | 35 | 35 |
| Luperco 231-XL[e] | 8 | 8 | 8 | 8 | 8 | 8 |
| ethyl carbazate | — | 2.0 | — | — | — | — |
| carbohydrazide | — | — | 2.0 | — | — | — |
| acetylhydrazide | — | — | — | 2.0 | — | — |
| toluic acid hydrazide | — | — | — | — | 2.0 | — |
| succinic acid hydrazide | — | — | — | — | — | 2.0 |
| Density (lb/ft$^3$) | 97.0 | 34.7 | 36.1 | 41.3 | 39.1 | 37.6 |

[a]ethylene-propylene-diene (EDPM) rubber with a specific gravity of 0.86 and a Mooney Viscosity (ML1+8(100° C.)) of 27–30 from Polysar Inc.
[b]HAF carbon black from Ashland Chemical Co.
[c]calcium carbonate from Thompson, Weinman & Co.
[d]paraffinic oil from Sun Refining and Marketing Co.
[e]1,1-bis(t-butylperoxy)-3,3,5-trimethylcyclohexane, 40% active on inert filler, from Pennwalt Corp.

EXAMPLE 19

The procedure of Example 11 was used in this example with a high impact polystyrene (HIPS) resin. A 300 grams sample of HIPS (FG-840, American Hoechst Corp.), having a specific gravity of 1.05, and a melt index of 3.5 was tumbled with 1.5 grams of 2,5-dimethyl-2,5-di(t-butylperoxy)hexane, then with 3.0 grams of di(t-butylhydrazinium)-terephthalate, then with 15 grams of pyrogenic silica. This mixture was extruded under the following parameters:

| Extruder barrel | Zone 1 | Temperature | 200° C. |
|---|---|---|---|
| Extruder barrel | Zone 2 | Temperature | 200° C. |
| Extruder barrel | Zone 3 | Temperature | 210° C |
| Extruder barrel | Zone 4 | Temperature | 230° C. |
| Extruder die | | Temperature | 230° C. |
| Extruder screw speed | | 20 rpm | |

The extrudate expanded to give a foamed HIPS resin of closed cell structure, having a density of 36.4 lbs/ft$^3$. In the absence of the gas generating composition, no foaming occurred and the extrudate had a density of 56.0 lbs/ft$^3$.

EXAMPLE 20

The procedure of Example 11 was used in this example with a styrene-acrylonitrile (SAN) resin. A 300 grams sample of SAN resin (Tyril 880B, Dow Chemical Co.) having a specific gravity of 1.08, and a melt index of 3.1 was tumbled with 1.5 grams of 2,5-dimethyl-2,5-di(t-butylperoxy)hexane, then with 3.0 grams of di(t-butylhydrazinium)terephthalate, then with 15 grams of pyrogenic silica. This mixture was extruded under the following parameters:

| Extruder barrel | Zone 1 | Temperature | 260° C. |
|---|---|---|---|
| Extruder barrel | Zone 2 | Temperature | 260° C. |
| Extruder barrel | Zone 3 | Temperature | 260° C. |
| Extruder barrel | Zone 4 | Temperature | 260° C. |
| Extruder die | | Temperature | 260° C. |
| Extruder screw speed | | 20 rpm | |

The extrudate expanded to give a foamed SAN resin of closed cell structure having a density of 34.6 lbs/ft$^3$. In the absence of a gas generating composition, no foaming occurred, and the extrudate product had a density of 66.0 lbs/ft$^3$.

EXAMPLE 21

The procedure of Example 11 was used herein with an acrylonitrile-butadiene-styrene (ABS) terpolymer. A 300 grams sample of ABS (PG-912 Natural, Dow Chemical Co.), having a specific gravity of 1.05 and a melt index of 2.6 was tumbled with 1.5 grams of 2,5-dimethyl-2,5-di(t-butylperoxy)hexane, then with 3.0 grams of di(t-butylhydrazinium)terephthalate, then with 15 grams of pyrogenic silica. This mixture was extruded under the following parameters:

| Extruder barrel | Zone 1 | Temperature | 195° C. |
|---|---|---|---|
| Extruder barrel | Zone 2 | Temperature | 200° C. |
| Extruder barrel | Zone 3 | Temperature | 210° C. |
| Extruder barrel | Zone 4 | Temperature | 230° C. |
| Extruder die | | Temperature | 230° C. |
| Extruder screw speed | | 20 rpm | |

The extrudate expanded to give a foamed ABS resin of closed cell structure, having a density of 37.4 lbs/ft$^3$. In the absence of the gas generating composition, no foaming occurred and the extrudate had a density of 58.4 lbs/ft$^3$.

EXAMPLE 22

The procedure of Example 11 was used similarly herein with a modified polyphenylene oxide polymer. A 300 grams sample of a modified polyphenylene oxide polymer (Noryl ® 731, General Electric Co.), having a specific gravity of 1.06, and a heat deflection temperature of 265° F. at 264 psi, was tumbled with 1.5 grams of 2,5-dimethyl-2,5-di(t-butylperoxy)hexane, then with 3.0 grams of di(t-butylhydrazinium)terephthalate. This mixture was extruded under the following parameters:

| Extruder barrel | Zone 1 | Temperature | 260° C. |
|---|---|---|---|
| Extruder barrel | Zone 2 | Temperature | 260° C. |
| Extruder barrel | Zone 3 | Temperature | 265° C. |
| Extruder barrel | Zone 4 | Temperature | 270° C. |
| Extruder die | | Temperature | 270° C. |
| Extruder screw speed | | 20 rpm | |

The extrudate expanded to give a foamed modified polyphenylene oxide polymer of closed cell structure having a density of 24.5 lbs/ft$^3$. In the absence of the gas generating composition, no foaming occurred and the extrudate had a density of 64.9 lbs/ft$^3$.

EXAMPLE 23

Using the masterbatch prepared in Example 15, the same method for producing a foam as described in Example 15 was followed but polypropylene (Pro-Fax 6323, from Hercules, Inc.), having a specific gravity of 0.903 and a melt index of 12 was used instead of low density polyethylene. The mixture was extruded under the following conditions:

| Extruder barrel | Zone 1 | Temperature | 160° C. |
|---|---|---|---|
| Extruder barrel | Zone 2 | Temperature | 160° C. |
| Extruder barrel | Zone 3 | Temperature | 160° C. |
| Extruder barrel | Zone 4 | Temperature | 170° C. |
| Extruder die | | Temperature | 170° C. |
| Extruder screw speed | | 30 rpm | |

The extruded foam had a density of 17.6 lbs/ft$^3$. As described in Example 15, a control, again using polypropylene instead of low density polyethylene was extruded and determined to have a density of 54.6 lbs/ft$^3$.

What is claimed:

1. A method of foaming thermoplastic polymers or a thermoplastic polymer-elastomer blend selected from the group of styrene-maleic anhydride resin, polystyrene and high impact polystyrene resins, styrene-acrylonitrile resins, acrylonitrile-butadiene-styrene resins, polypropylene, low and high density polyethylene, polyphenylene oxide and modified polyphenylene oxide resins comprising adding to the polymeric resin the gas-generating composition consisting essentially of from a t-alkylhydrazinium salt and/or carbonylhydrazine and at least one compound selected from free radical forming sources, metal oxides, and sulfur and/or sulfur donor compounds wherein when sulfur and/or a sulfur donor compound is used, the composition will also contain one or more members selected from sulfur accelerators, metal oxides, and amino-alcohols as the foaming agent and heating until the foaming is completed under processing conditions such that the thermoplastic and/or elastomer properties of the original polymer are maintained.

2. The method of claim 1 wherein the elastomer is EPDM.

3. The method of claim 1 wherein the elastomerthermoplastic blends are selected from the group of EPDM in combination with low density polyethylene and EPDM in combination with polypropylene.

4. A method of foaming polyurethanes comprising adding to the polymeric resin the gas-generating composition consisting essentially of from a t-alkylhydrazinium salt and/or carbonylhydrazine and at least one compound selected from free radical forming sources, metal oxides, and sulfur and/or sulfur donor compounds wherein when sulfur and/or a sulfur donor compound is used, the composition will also containe one or more members selected from sulfur accelerators, metal oxides, and amino-alcohols as the foaming agent and heating until the foaming is completed under processing conditions such that the thermoplastic and/or elastomer properties of the original polymer are maintained.

* * * * *